United States Patent
Crawley

(10) Patent No.: US 10,681,749 B2
(45) Date of Patent: Jun. 9, 2020

(54) METHOD AND APPARATUS FOR WLAN DEVICE PAIRING

(71) Applicant: INTERDIGITAL CE PATENT HOLDINGS, Paris (FR)

(72) Inventor: Casimir Johan Crawley, Carmel, IN (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 60 days.

(21) Appl. No.: 15/528,967

(22) PCT Filed: Oct. 15, 2015

(86) PCT No.: PCT/US2015/055740
§ 371 (c)(1),
(2) Date: May 23, 2017

(87) PCT Pub. No.: WO2016/085582
PCT Pub. Date: Jun. 2, 2016

(65) Prior Publication Data
US 2017/0273123 A1    Sep. 21, 2017

Related U.S. Application Data

(60) Provisional application No. 62/083,377, filed on Nov. 24, 2014.

(51) Int. Cl.
*H04W 76/11* (2018.01)
*H04W 12/08* (2009.01)
(Continued)

(52) U.S. Cl.
CPC .......... *H04W 76/11* (2018.02); *H04W 12/003* (2019.01); *H04W 12/0023* (2019.01);
(Continued)

(58) Field of Classification Search
CPC ..... H04W 12/04; H04W 12/08; H04W 48/12; H04W 76/11; H04W 84/12
See application file for complete search history.

(56) References Cited

U.S. PATENT DOCUMENTS 8,488,493 B2    7/2013  Won
10,075,906 B2 *  9/2018  Kreiner ................. H04W 48/18
(Continued)

FOREIGN PATENT DOCUMENTS

EP    1928125 A1    6/2008
EP    2112844 A2   10/2009
(Continued)

OTHER PUBLICATIONS

Wi-Fi Alliance: "Wi-Fi Certified for Wi-Fi Protected Setup: Easing the User Experience for Home and Small Office Wi-Fi Networks;" Jan. 1, 2007, pp. 1-14.
(Continued)

*Primary Examiner* — Saad A. Waqas
(74) *Attorney, Agent, or Firm* — Jerome G. Schaefer

(57) ABSTRACT

A method for pairing a wireless device with an access point using a push button on the access point includes receiving a request at an access point to join a wireless network and receiving a push button command to pair the wireless device to the access point. The method then inhibits broadcast of all service set identifiers associated with the access point and determines if the wireless device is permitted to pair with the access point. The access point then broadcasts only a service set identifier associated with the wireless device so that erroneous pairings between the access point and the wireless device are prevented.

15 Claims, 8 Drawing Sheets

(51) Int. Cl.
   *H04W 48/12*   (2009.01)
   *H04W 12/00*   (2009.01)
   *H04W 12/04*   (2009.01)
   *H04W 76/14*   (2018.01)
   *H04W 84/12*   (2009.01)

(52) U.S. Cl.
   CPC ........... *H04W 12/04* (2013.01); *H04W 12/08* (2013.01); *H04W 48/12* (2013.01); *H04W 76/14* (2018.02); *H04W 84/12* (2013.01)

(56) References Cited

U.S. PATENT DOCUMENTS

| | | | |
|---|---|---|---|
| 2010/0034120 A1 | 2/2010 | Nakajima et al. | |
| 2011/0276672 A1 | 11/2011 | Kwon et al. | |
| 2011/0296501 A1* | 12/2011 | Drovdahl | H04L 63/18 |
| | | | 726/4 |
| 2012/0147777 A1* | 6/2012 | Arashin | H04W 72/02 |
| | | | 370/252 |
| 2012/0230221 A1 | 9/2012 | Radhakrishnan et al. | |
| 2014/0328334 A1 | 11/2014 | Viswanathan et al. | |
| 2016/0212695 A1* | 7/2016 | Lynch | H04W 48/08 |

FOREIGN PATENT DOCUMENTS

| | | |
|---|---|---|
| WO | WO2012141803 A1 | 10/2012 |
| WO | WO2013156860 A1 | 10/2013 |

OTHER PUBLICATIONS

Coleman; "6.2 Wi-Fi Protected Setup (WPS)" In: "CWSP Certified Wireless Security Professional Official: Study Guide;" Feb. 17, 2010; Sybex.

* cited by examiner

METHOD AND APPARATUS FOR WLAN DEVICE PAIRING

This application claims the benefit, under 35 U.S.C. § 365 of International Application PCT/US2015/055740 filed Oct. 15, 2015 which was published in accordance with PCT Article 21(2) on 2 Jun. 2016 in English and which claims priority to U.S. Provisional Application Ser. No. 62/083,377, filed on 24 Nov. 2014, which is incorporated by reference herein in its entirety.

FIELD

The present invention relates to the setup and use of wireless networks, specifically the pairing of devices in a WLAN.

BACKGROUND

Several methods for joining a wireless network already exist. The basic method is the direct sharing of the WiFi™ key. This method has drawbacks: it is complicated and error prone. Moreover it reveals the WiFi™ key. Having those drawbacks in mind, the WiFi™ alliance promoted WiFi™ Protected Setup (WPS) procedures. This is a set of methods that ease the process of entering a WiFi™ network. In one method called the WPS Push Button Configuration (PBC) method, the user presses two buttons, one on the entering (enrollee) device and one on the access point (AP). This method takes time because of a two minute temporization time period. If this temporization is not implemented, the method is known to be vulnerable. Also, an unintended device could join the network if it is in range. It is well known that service set identifiers SSIDs of AP services may be hidden and not transmitted during normal WLAN operation in order to hide such SSIDs from detection and hacking. However, it is a generally accepted practice to transmit all AP SSID information during a WPS PBC procedure. This is performed so that all of the possible SSIDs of an access point are available for a joining or enrolling station STA to access. But, there are risks for the access point network and the remote station in a WPC PBC process. For example, the STA can mistakenly pair with a wrong SSID resulting in the STA not receiving the AP services it desires. An incorrect pairing of an AP and STA could provide connection to an SSID service that is not authorized for the particular STA. An incorrect pairing may simply not allow proper data exchange because of incompatibilities between different AP and STA capabilities. Service failure, interruption of service, and security breaches may result from incorrect pairings. Also, the STA could pair with the wrong AP resulting in a security threat or operation difficulty.

Solutions to this incorrect pairing problem include transmitting all of the SSIDs during a WPC PBS setup but requiring the STAs to transmit a customer identifier string during the WPS set up so that the AP can recognize and pair only with authorized STAs. This pairing protection scheme PPS insures that unauthorized STBs never connect to AP WLAN services that are not compatible with the authorization or capabilities of a STA joining the WLAN using the WPS PCB process. However, this solution still does not prohibit STBs that are not customer identifier protected from pairing with lower priority or incorrect APs during the WPC PBC pairing process. The above disadvantages should be overcome and an easier and more secure method is needed to prevent undesired pairing of STAs with APs in a wireless network.

SUMMARY

This summary is provided to introduce a selection of concepts in a simplified form as a prelude to the more detailed description that is presented later. The summary is not intended to identify key or essential features of the invention, nor is it intended to delineate the scope of the claimed subject matter.

In one aspect of the invention, a method for pairing a wireless device with an access point using a push button on the access point includes receiving a request at an access point to join a wireless network and receiving a push button command to pair the wireless device to the access point. The access point inhibits the broadcast of all service set identifiers associated with the access point. The access point determines if the wireless device is permitted to pair with the access point. In one embodiment, a media access control address of the wireless device is compared with a list a permitted wireless devices for the determination. If the wireless device is permitted to pair with the access point, a service set identifier associated with the wireless device is broadcast to the wireless device. Pairing of the access with the wireless device is performed. Erroneous pairings are avoided because the only visible service set identifier for the wireless station is the service set identifier that is permitted for the wireless device. After pairing, the wireless device can access the resources of the access point.

In another aspect of the invention, a method for pairing a wireless device with an access point in a wireless network using a personal computer in communications with the access point includes receiving a selection of a service set identifier from the personal computer. The access point inhibits broadcast of all service set identifiers except for the service set identifier selected for the wireless device by the personal computer. The personal computer provides a logical push button configuration activation and pairing of the access point with the wireless device is accomplished. After pairing, the access point restores the broadcast of all of the service set identifiers. The newly added wireless device can then exchange information between the access point and the wireless device across the wireless network.

Additional features and advantages of the invention will be made apparent from the following detailed description of illustrative embodiments which proceeds with reference to the accompanying figures. It should be understood that the drawings are for purposes of illustrating the concepts of the disclosure and is not necessarily the only possible configuration for illustrating the disclosure.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention. In the drawings, like numbers represent similar elements.

DETAILED DISCUSSION OF THE EMBODIMENTS

In the following description of various illustrative embodiments, reference is made to the accompanying drawings, which form a part thereof, and in which is shown, by way of illustration, how various embodiments in the invention may be practiced. It is to be understood that other embodiments may be utilized and structural and functional modification may be made without departing from the scope of the present invention.

Figure 1:
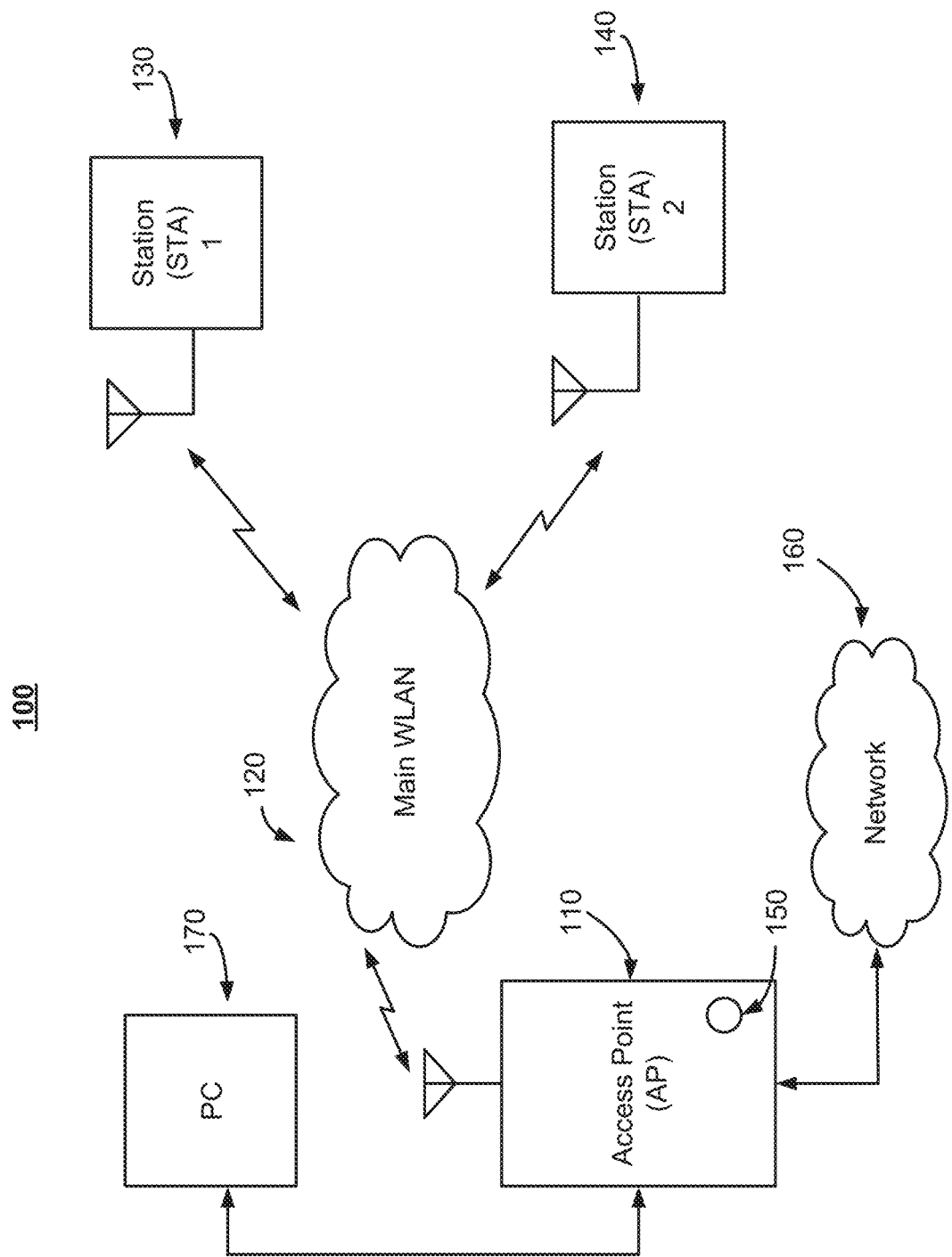
FIG. 1 illustrates an example environment in which the current invention may be practiced.

FIG. 1 illustrates a system 100 which serves as an example environment for the present invention. An access point (AP) 110 has the capability to control a WLAN 120. The AP can be a router, a gateway, or combination router gateway that can manage the WLAN 120 and provide access to services such as network 160 access. Network 160 can represent available AP resources such as internet access, storage access, LAN access, and the like. Stations 130 and 140 are example remote terminals or stations (STA) that can wirelessly connect to the AP 110 via WLAN 120 to gain access to AP system resources such as network 160. The AP 110 has a physical push button 150 that allows for WiFi™ Protected setup (WPS) Push Button Configuration (PBC) functionality.

In one embodiment, a personal computer 170 may be connected to the AP, either via RF link or via hardline to provide a user with access and management control of the AP. The configuration of the AP may be setup or modified via the PC 170. Using the PC, WLAN network configurations, such as security and access settings, may be adjusted by a user or system administrator.

Figure 2:
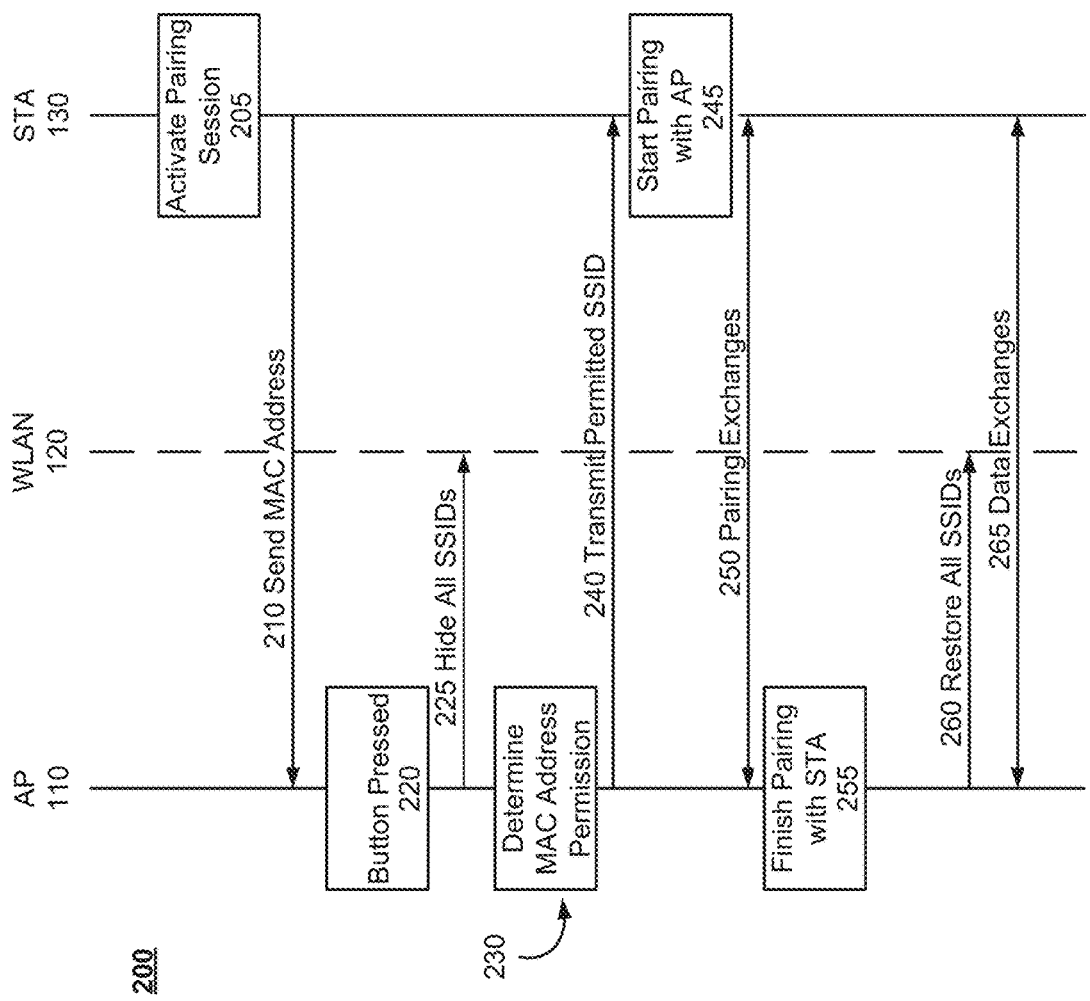
FIG. 2 depicts an example signal exchange diagram between an access point and a station according to a first method of the invention.

FIG. 2 depicts a signaling or activity diagram 200 between the AP 110 and an example remote station, such as the STA 130. Communications between the STA 130 and the AP 110 occur through the wireless local area network WLAN 120. Initially, a pairing session is initiated at activity 205. Here, the STA 130 initiates transmission of a media access control (MAC) address to the AP 110 using signal 210. However, the AP 110 does not respond until the PBC button 150 of FIG. 1 is depressed by a system user as in activity 220. After activity 220, the AP 110 hides all SSIDs by turning off the transmission of identifying indicia of the SSIDs related to the AP 110. During this time, remote stations, such as STA 140, which may already be linked to the AP, continue to operate without public identification of SSID names. At activity 230, the AP examines the MAC address of STA 130 to determine of the STA 130 has permission to gain access to the AP 110. It does this by comparing the incoming MAC address with a list of authorized MAC addresses.

Assuming that the MAC address of STA 130 is acceptable via comparison of the list, then the SSID of the authorized service for the specific MAC address is transmitted. At this point, only the SSID of the authorized service for the MAC address of STA 130 is transmitted via signal 240. The STA 130 is then able to initiate the pairing process at activity 245 by selecting the available SSID that is compatible with the AP 110. The selection of a compatible and authorized SSID is based on the MAC address of the STA and the selection is limited to only the SSID that was made visible by the AP. The transmission of SSID is enabled via the association of the MAC address of the STA 130 on the list of service associated with that specific MAC address. This selective transmission avoids the STA 130 selecting a wrong or unsuitable SSID.

In the pairing process started by activity 245, pairing exchanges 250 are performed. Such pairing exchanges may include the exchange of public and private encryption keys, such as "Diffie-Hellman-Merkle" key exchanges. As a result of the pairing key exchanges 250 the AP 110 is able to finish the pairing to the STA 130 at activity 255. After the pairing is established, the pairing process is considered complete and all previous transmissions of SSIDs from the AP 110 are restored at signaling 260. Data exchanges between the AP 110 and the newly paired STA 130 may now take place as example data exchanges 265. Note that the WPS PBC method of FIG. 2 only involves the interaction of two active machines: the AP 110 and the STA 130 across the WLAN 120. In the FIG. 2 signaling diagram, a physical push button 150 is used. However, a logical push button signaling is also possible according to aspects of the invention.

Figure 3:
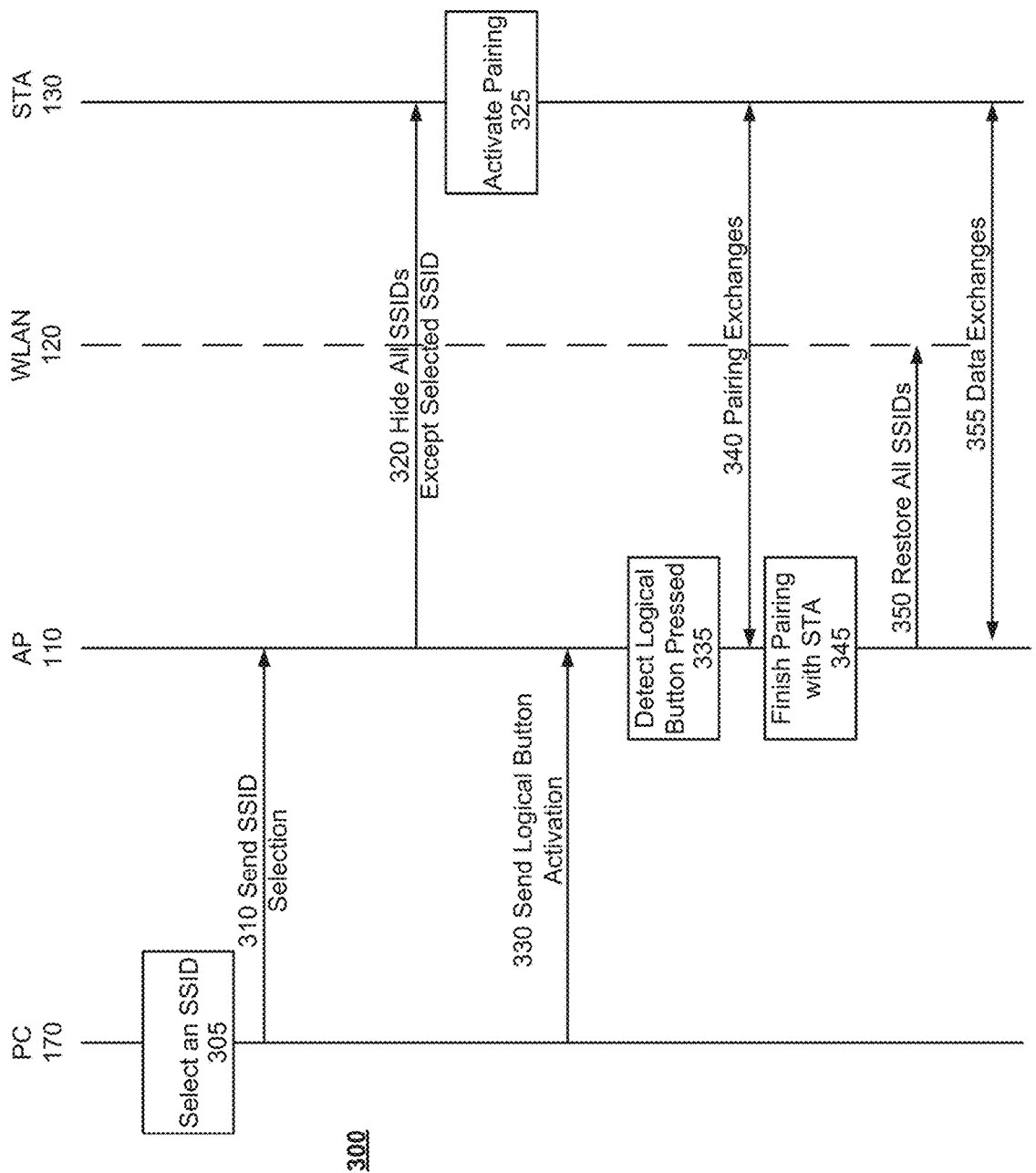
FIG. 3 depicts an example signal exchange diagram between an access point, a personal computer, and a station according to a second method of the invention.

FIG. 3 depicts a signaling or activity diagram 300 between a personal computer 170 (PC), an AP 110, and a STA 130. This signaling scheme involves a logical PBC method instead of a physical PBC method. In FIG. 3, the PC 170 is used to select an SSID for a WLAN accessible service for STA 130 that is available via AP 110. The selection of SSID for the STA 130, which has no communicative connection to the WLAN 120, is performed at activity 305. As a result, signal 310 is sent which includes the SSID selection. The signaling 310 is sent from the PC 170 to the AP 110.

After receipt of the SSID selection of 310, the AP acts with signal 320 to hide all SSIDs except for the selected SSID. Hiding all SSIDs except the selected SSID for STA 130 permits STA 130 to easily select the correct SSID at activity 325. The STA 130 at 325 initiates the pairing activity by selecting the transmitted SSID without having to make a selection from a multitude of SSIDs. Hiding all SSIDs except for the selected SSID for STA 130 guarantees that STA 130 does not connect to an incorrect SSID. In prior systems, STA 130 would have to select which SSID it wanted to pair with because all SSIDs may be transmitted in the WPS PBC process. This can lead to the STA 130 pairing with an incorrect SSID or a STA 310 PBC overlap pairing failure. However, the improved technique represented in FIG. 3 ensures that the STA 130 pairs with only the selected and authorized SSID.

The PC 170 sends a logical push button activation signal to the AP 110 via signal 330. Signal 330 is detected by the AP 110 as a logical button press at activity 335. This activity also initiates pairing signal exchanges 340. Such pairing exchanges may include the exchange of public and private encryption keys, such as "Diffie-Hellman-Merkle" key exchanges. As a result of the pairing key exchanges 340 the AP 110 is able to finish the pairing to the STA 130 at activity 345. After the pairing is established, the pairing process is considered complete and SSID transmissions from the AP 110 are restored at signaling 350. Data exchanges between the AP 110 and the paired STA 130 may now take place as example data exchanges 355.

Figure 4:
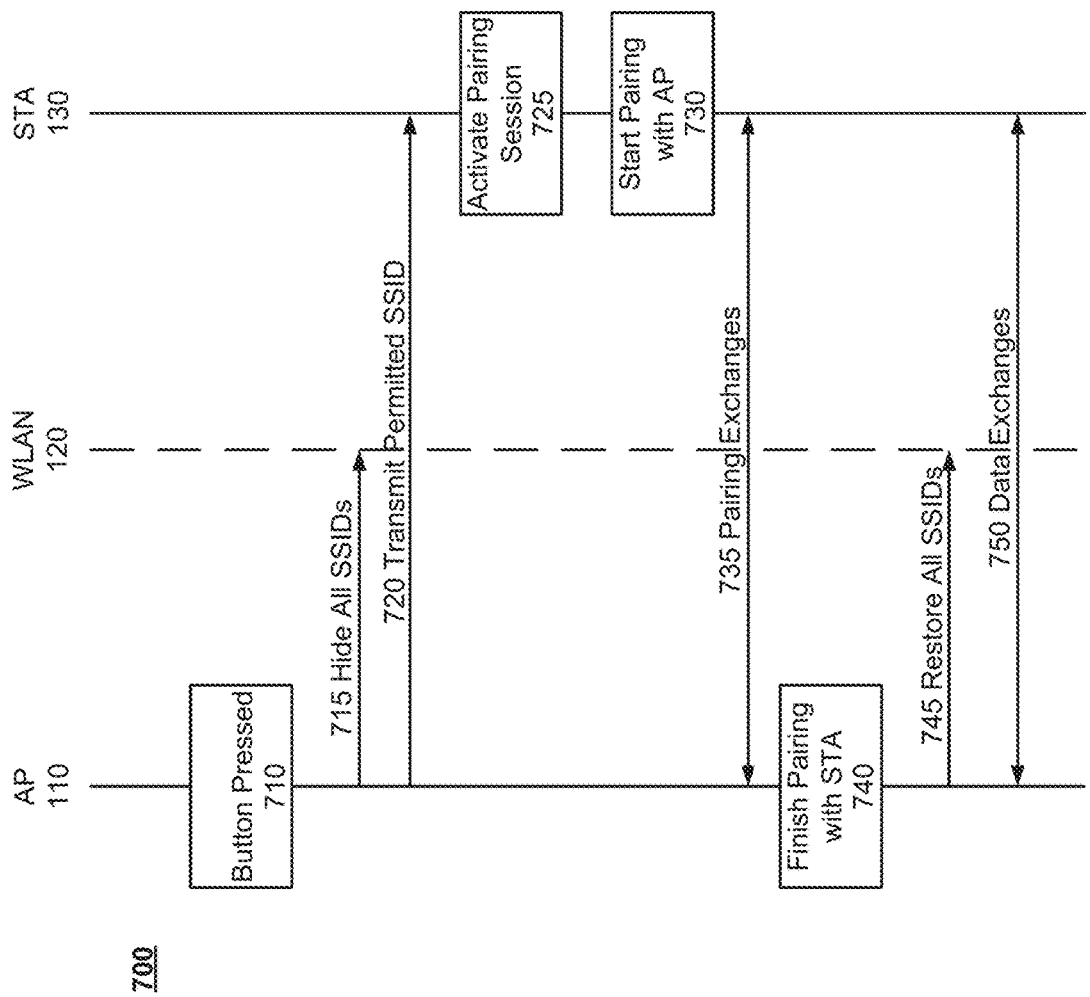
FIG. 4 depicts an example signal exchange diagram between an access point and a station according to a third method of the invention.

FIG. 4 depicts a signaling or activity diagram 700 between the AP 110 and an example remote station, such as the STA 130. Communications between the STA 130 and the AP 110 occur through the wireless local area network WLAN 120. At step 710, a physical button on the AP 110 is pressed. In one embodiment, the physical button is pressed a number of times, such as three times, to indicate that a specific SSID is to be chosen. In an alternate embodiment, a special physical button is pressed to indicate a specific SSID selection. In either event, the AP 110 interprets the button pressing as the selection of a pre-selected SSID for pairing with STA 130. After the button press activity 710, the AP 110 hides all SSIDs by turning off the transmission of identifying indicia of the SSIDs related to the AP 110. During this time, remote stations, such as STA 140, which may already be linked to the AP, continue to operate without public identification of SSID names.

At this point, when the SSID names are hidden, only the specific SSID for pairing with STA 130 is transmitted via signal 720. The STA 130 is then able to initiate the pairing process at activity 725 by selecting the only available SSID whose identity is transmitted by the AP 110. The selection of a compatible and authorized SSID is limited to only the SSID that was made visible by the AP. This selective transmission avoids the STA 130 selecting a wrong or unsuitable SSID.

At step 730, the STA 130 initiates pairing with the AP 110. In the pairing process started by activity 730, pairing exchanges 735 are performed. Such pairing exchanges may include the exchange of public and private encryption keys, such as "Diffie-Hellman-Merkle" key exchanges. As a result of the pairing key exchanges 735 the AP 110 is able to finish the pairing to the STA 130 at activity 740. After the pairing is established, the pairing process is considered complete and all previous transmissions of SSIDs from the AP 110 are restored at signaling 745. Data exchanges between the AP 110 and the newly paired STA 130 may now take place as example data exchanges 750.

Figure 5:
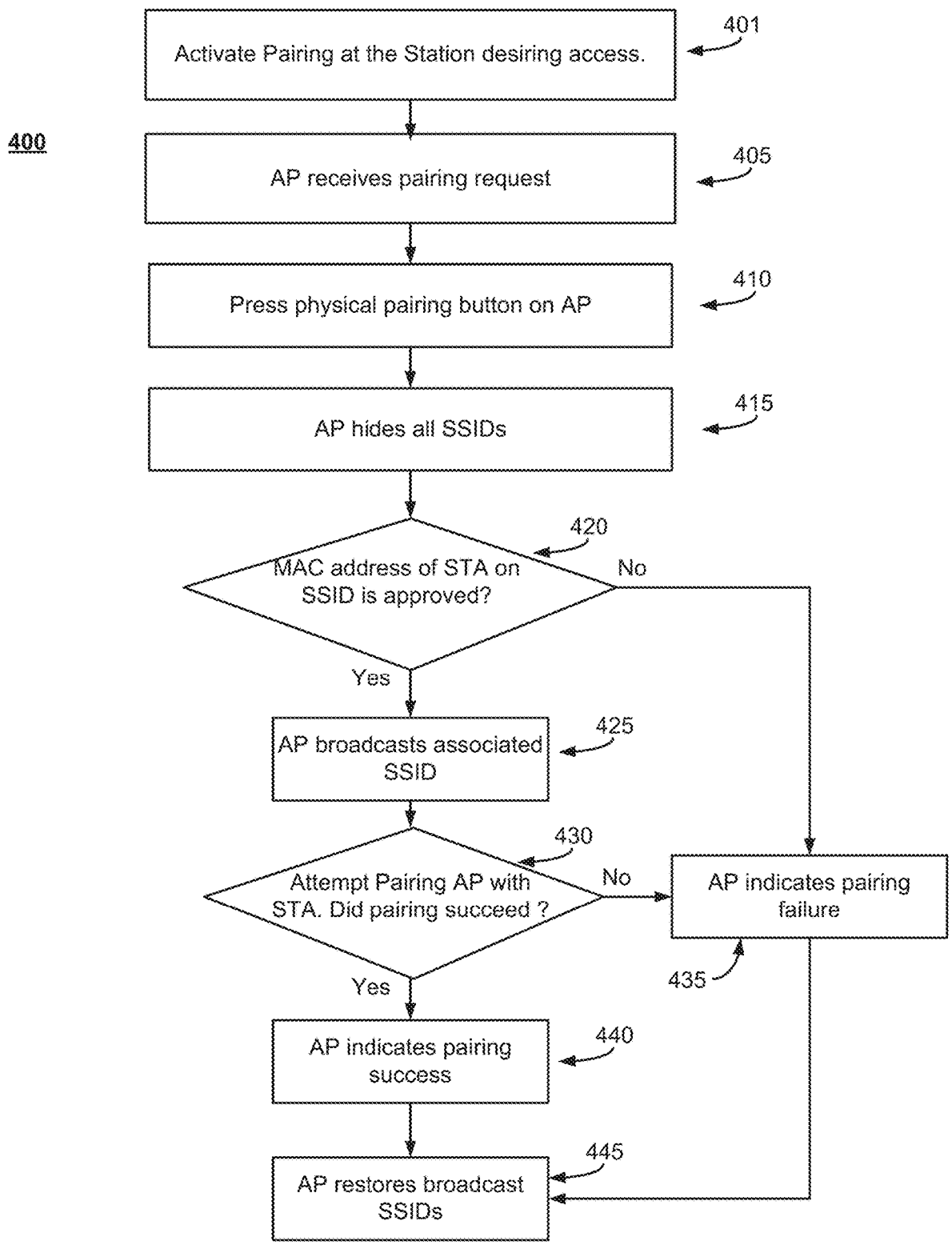
FIG. 5 depicts steps of a first example method according to aspects of the invention.

FIG. 5 is an example method 400 that uses an improved WPS PBC physical pushbutton according to aspects of the invention. FIG. 5 is an example method that utilizes the example signal flow of FIG. 2. The method 400 includes a wireless device, such as STA 130, and an access point, such as AP 110. At step 401, the STA 130 activates a pairing request. This request is accomplished via use of a user interface on the STA 130 requesting access to the WLAN 120 via the AP 100. As part of the request, an identity indication of the STA 130 is provided to the AP 110. In one embodiment, the identity indication is a MAC address. This MAC address may be part of a beacon message where the wireless station, seeking to operate on an IEEE 802.11 WLAN, starts transmitting beacon messages to the AP.

As a result of the request at 401, the AP 110 receives the pairing request and MAC address of the STA 130 at step 405. At step 410, the AP 110 receives a push button configuration control command via an activation of the push button on the AP 110, such as push button 150 of FIG. 1. The activation of the push button provides a push button command to the AP 110 to pair the wireless device, such as STA 130, to the AP. Receiving a push button command at the AP includes receiving an indication at the access point that the pairing button, such as button 150 of FIG. 1, has been activated.

At step 415 the AP acts to inhibit broadcasting of all SSIDs associated with the AP. This inhibition or ceasing of transmission of all SSIDs from the AP provides an indication that the present improved WiFi™ or wireless protected setup (WPS) has commenced. In contrast to a conventional WPS method where all SSIDs may be transmitted, method 400 hides all SSIDs by ceasing the broadcasting of all SSIDs associated with the AP. At step 420 the AP determines if the wireless device, such as a STA is permitted to pair with the AP. This step includes comparing an identifier indicator, such as a MAC address, of the wireless device with a listing of SSIDs and wireless device indicators. Pairing of the wireless device is permitted if the wireless device indicator corresponds to an approved device for AP access on the listing of SSIDs and wireless device indicators.

If the MAC address of the wireless device is not approved to operate on the SSID of the AP, then step 435 is performed. Step 435 is a step which can indicate, via screen display, LED illumination, printing or logging that pairing of the wireless device with the AP has failed. Then, step 445 is undertaken which restores all of the normally transmitted SSID broadcasts. Returning to step 420, if the AP does permit the MAC address of the wireless device on the SSID, then step 425 is performed. Step 425 broadcasts only the SSID that is associated with the wireless device that seeks access to the AP. This step ensures that the wireless device only sees a compatible and authorized SSID available for pairing. Thus, the wireless station is prevented from erroneously pairing with a SSID that is not compatible or authorized for pair with the wireless station. Stated another way, the broadcasting of only the selected SSID ensures that the wireless device pairs with only a correct service set identifier.

At step 430 the AP and wireless device attempt a pairing using the SSID that is broadcast to the wireless station. The pairing process includes exchanging security keys between the AP and the wireless device. In one embodiment, pairing signal exchanges include public and private encryption key exchanges, such as "Diffie-Hellman-Merkle" key exchanges. If the pairing fails, step 435 and 445 are performed. If the pairing succeeds, then step 440 may be performed in which the AP provides an indication, such as display on a screen or an LED, print, or data logging, of the pairing success. Then, step 445 is performed to restore all of the previously broadcast SSIDs associated with the AP. The wireless device and the AP then can exchange data as would be normal for a paired AP and wireless device communicating over a WLAN.

Figure 6:
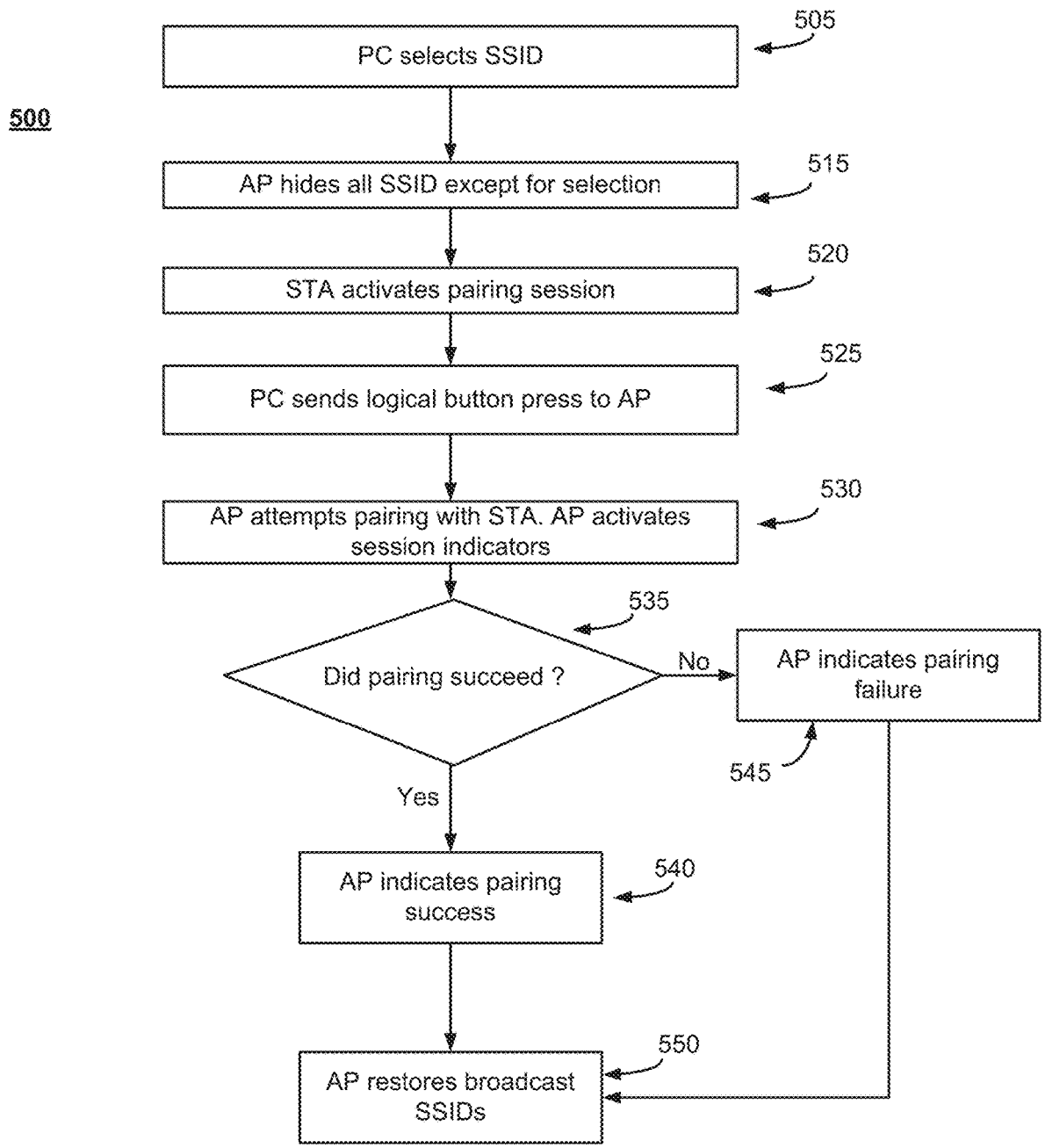
FIG. 6 depicts steps of a second example method according to aspects of the invention.

FIG. 6 is an example method 500 that uses an improved WPS PBC logical pushbutton according to aspects of the invention. FIG. 6 is an example method that utilizes the example signal diagram of FIG. 3. The method 500 includes a terminal, such as personal computer 170, a wireless device, such as STA 130, and an access point, such as AP 110. The PC 170 may have a wired connection to the AP, such as shown in FIG. 1, or may be connected via an RF interface, such as via WLAN 120 using a protocol such as IEEE 802.11. At step 505, the PC is provided a selection of an SSID for the wireless station, such as STA 130, so that the wireless station can operate on the WLAN of the AP. A user of the PC can provide the selection of SSID. Thus a request for the addition of the wireless station to an SSID is provided to the AP by the PC. At step 515, the AP hides all SSIDs except for the requested SSID selection made by the PC. Hiding all SSIDs from the pairing wireless device, STA 130, prevents pairing of the wireless device to a service set identifier that is not associated with the wireless device. Stated another way, the broadcasting of only the selected SSID ensures that the wireless device pairs with only a correct service set identifier.

At step 520, the wireless station activates a pairing request. This pairing request activation can be accomplished using a user interface on the wireless device so that pairing of the wireless device to the AP is initiated. At step 525, the AP receives a logical push button configuration activation signal (logical push button press) from the PC. Receiving a logical push button configuration activation from the PC includes receiving a signal indication from the PC that a logical push button activation is initiated. The AP detects this logical activation signal.

As a result, at step 530, the AP attempts pairing with the wireless device. Pairing includes exchanging security keys between the AP and the wireless device. In one embodiment, pairing signal exchanges include public and private encryption key exchanges, such as "Diffie-Hellman-Merkle" key exchanges. Also at step 530 the AP can activate wireless pairing session indicators if available. These indicators can be a display, such as a screen display or a LED illumination, a printing, or a logging of pairing activity. At step 535, the AP assesses if the pairing has succeeded. If the pairing did not succeed, then step 545 can indicate a pairing process failure. Such a failure indication can include a display on a screen or an LED, print, or data logging, of the pairing failure. The AP can then restore the broadcasting of all SSIDs via step 550. If the pairing assessment of step 530 is positive, then the AP may indicate, if available an indication of pairing success. Such an indication can include a display on a screen or an LED, print, or data logging, of the pairing success. Once the status of the pairing is known, then the AP performs step 550 by restoring the broadcasting of all active SSIDs of the AP. This signifies the end of the pairing process and the continuation of normal exchanges of data and other information between the access point and the wireless device across the wireless network.

Figure 7:
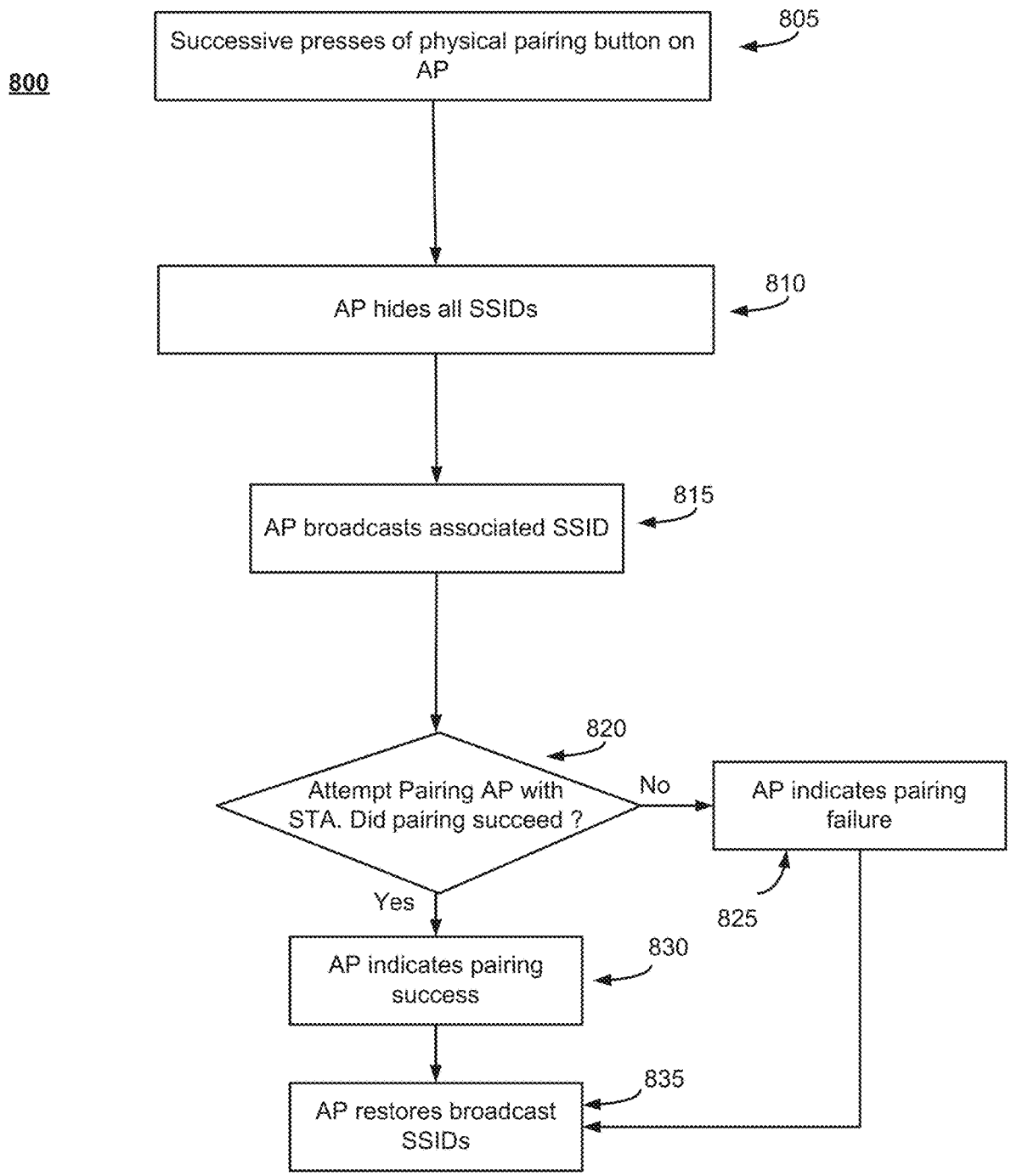
FIG. 7 depicts steps of a third example method according to aspects of the invention.

FIG. 7 is an example method 800 that uses an improved physical pushbutton configuration method according to aspects of the invention. FIG. 7 is an example method that utilizes the example signal flow of FIG. 4. The method 800 includes a wireless device, such as STA 130, and an access point, such as AP 110. In one embodiment, at step 805, successive presses or activations of a physical pairing button on the AP 110 are made in a given time interval. An example time interval is 10 seconds. However other time intervals can also be used such as 5, 15, or 20 seconds. In an alternative embodiment, a special, dedicated push button on the AP 110 may be pressed. Whether the button activations are multiple or are of a single special pushbutton, other than a WPS PBC button for example, the AP 110 is alerted to the fact that a specific SSID is to be used for pairing. This specific SSID may be preselected within the AP 110 so that a specific wireless station, such as STA 130, can be paired with only the AP selected SSID.

At step 810 the AP acts to inhibit broadcasting of all SSIDs associated with the AP. This inhibition or ceasing of transmission of all SSIDs from the AP 110. In contrast to a conventional WPS PBC method where all SSIDs may be transmitted, method 800 hides all SSIDs by ceasing the broadcasting of all SSIDs associated with the AP. Step 815 broadcasts only the SSID that is associated with the wireless device that seeks access to the AP. This step ensures that the wireless device only sees a compatible and authorized SSID available for pairing. Thus, the wireless station is prevented from erroneously pairing with a SSID that is not compatible or authorized for pair with the wireless station. Stated another way, the broadcasting of only the selected SSID ensures that the wireless device pairs with only a correct service set identifier.

At step 820 the AP and wireless device attempt a pairing using the SSID that is broadcast to the wireless station. The pairing process includes exchanging security keys between the AP and the wireless device. In one embodiment, pairing signal exchanges include public and private encryption key exchanges, such as "Diffie-Hellman-Merkle" key exchanges. If the pairing fails, step 825 and 835 are performed. If the pairing succeeds, then step 830 may be performed in which the AP provides an indication, such as display on a screen or an LED, print, or data logging, of the pairing success. Then, step 835 is performed to restore all of the previously broadcast SSIDs associated with the AP. The wireless device and the AP then can exchange data as would be normal for a paired AP and wireless device communicating over a WLAN.

Figure 8:
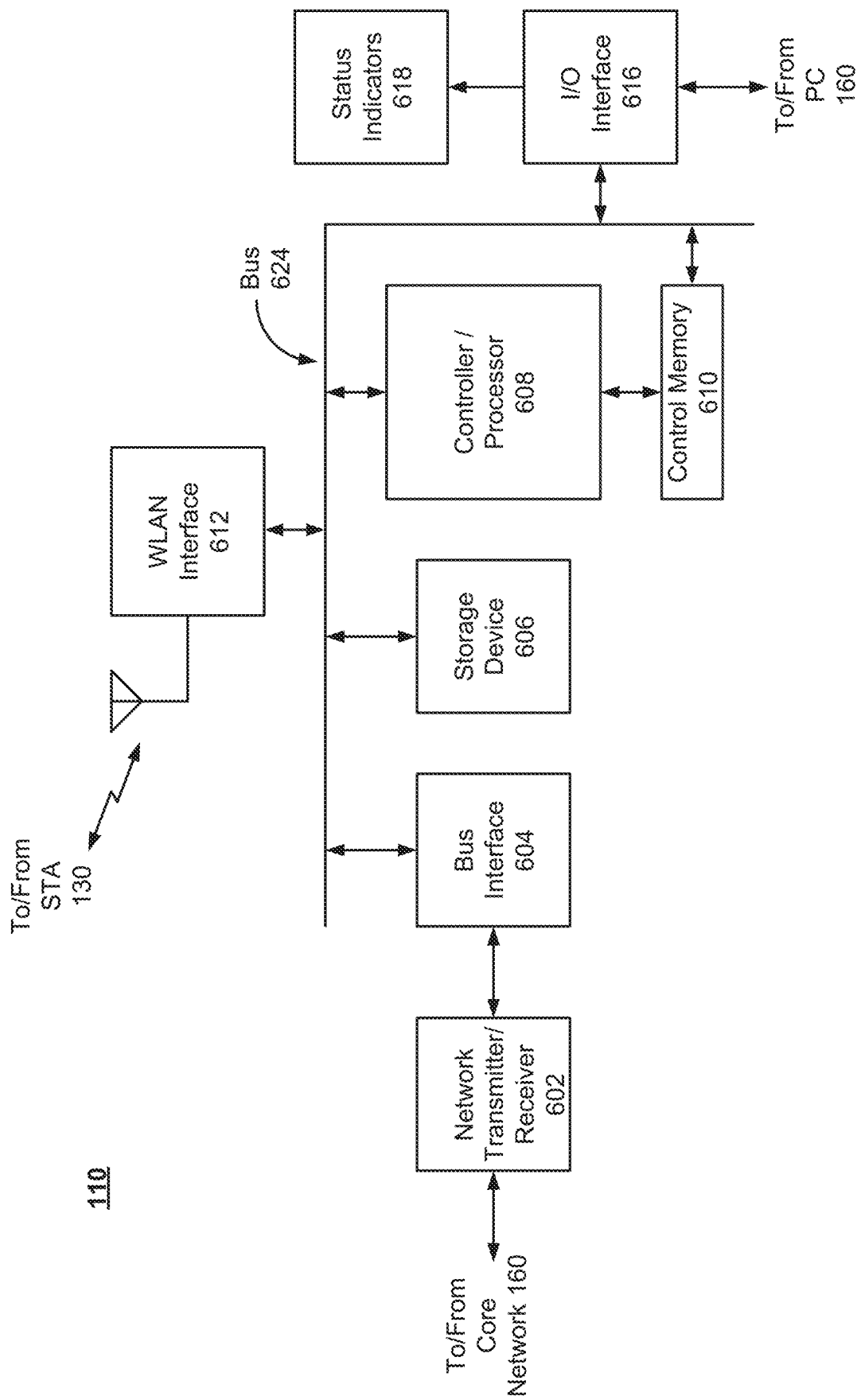
FIG. 8 illustrates an example access point according to aspects of the invention.

FIG. 8 is an example embodiment of an AP, such as that shown in FIG. 1, item 110. Here, a connection to a core network 160 is via the network transmitter/receiver interface 602. The core network 160 connection referred to here may include a connection to the internet or other resources which may include servers, remote or cloud memory, or other possible network services. The core network interface 602 connects to the bus interface 604 which allows access to the internal bus 624. Other non-bus implementations are also possible as is well known to those of skill in the art. Present on bus 624 are a storage device 606 which can be used for any general storage such as retrieved or requested data and network management data, parameters, and programs. Such network management and other programs are under the control of controller/processor 608.

This controller/processor 608 may be a single processor or a multiplicity of processors performing the tasks of network management, user interface control, and resource managements. Control memory 610 can supply program instruction and configuration control for controller/processor 608. The user interface 618 allows a user, network owner, or network manager to see a status of the AP 110. Such indicators may include a display, LEDs, printer interface, or data logging interface. An input/output (I/O) interface 616 allows the AP 110 to connect to a personal computer or other device that can be used to configure and control the AP. The I/O interface 616 may be a hardline interface, such as an Ethernet interface or may operationally be substituted with an RF interface so that the AP 110 can communicate with a PC via a protocol driven interface, such as IEEE 802.XX. Alternately, a remote terminal, such as PC 160 may also be connected to a WLAN operated by the AP. Other interfaces that are possible via I/O interface 616 are an interactive interface which may include the use of a display device, keyboard, mouse, light pen, and the like.

AP 110 has a wireless network interface 612 which allows access to and from regular users to the resources of the core network 160. Such an interface includes all elements to control a wireless network, including the use of wireless network protocols such as IEEE 802.XX and the like. The controller/processor 608 of the AP 110 of FIG. 6 is configured to provide processing services for the steps of the methods of FIGS. 4 and 5. For example, the controller processor can provide instruction control to monitor and control the interfaces of the network transmitter/receiver 602, the I/O interfaces 616 and 618, and the WLAN interface 612. Controller/processor 608 directs the flow of information through AP 110 such that the AP activities of signal FIGS. 2 and 3 are performed as well as the method of FIGS. 4 and 5.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus, hardware and software apparatus. An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device.

Additionally, the methods may be implemented by instructions being performed by a processor, and such instructions may be stored on a processor or computer-readable media such as, for example, an integrated circuit, a software carrier or other storage device such as, for example, a hard disk, a compact diskette ("CD" or "DVD"), a random access memory ("RAM"), a read-only memory ("ROM") or any other magnetic, optical, or solid state media. The instructions may form an application program tangibly embodied on a computer-readable medium such as any of the media listed above or known to those of skill in the art. The instructions thus stored are useful to execute elements of hardware and software to perform the steps of the method described herein.

The invention claimed is:

1. A method for pairing a new wireless device with an access point, the method comprising:
   receiving a request including an identity indication at an access point from the new wireless device to join a wireless network, the access point transmitting one or more service set identifiers associated with the access point on the wireless network, wherein the one or more service set identifiers operating with public identification are visible to the new wireless device on the wireless network;
      receiving a command via a logical or physical push button to pair the new wireless device to the access point;
   inhibiting broadcast of all service set identifiers transmitted by the access point, whereby all service set identifiers broadcast by the access point are rendered hidden to the new wireless device;
   determining if the new wireless device is permitted to pair with the access point to join the wireless network;
   broadcasting a service set identifier associated with the new wireless device, wherein only the service set identifier associated with the new wireless device is transmitted and made visible to the new wireless device;
   pairing the access point with the new wireless device on the wireless network;
   restoring broadcast of all service set identifiers associated with the access point on the wireless network, wherein the service set identifiers previously rendered hidden are made visible to the new wireless device; and
   exchanging information between the access point and the new wireless device across the wireless network.

2. The method of claim 1, wherein the identity indication is a medium access control address as part of a beacon message.

3. The method of claim 1, wherein receiving a command comprises receiving an indication at the access point that a pairing button has been activated.

4. The method of claim 1, wherein inhibiting broadcast of all service set identifiers further comprises providing an indication that a wireless protected setup has commenced.

5. The method of claim 1, wherein determining if the new wireless device is permitted to pair with the access point further comprises:
   comparing an identifier indicator of the new wireless device with a listing of service set identifiers and wireless device indicators, wherein pairing of the new wireless device is permitted if the new wireless device identifier indicator is on the listing.

6. The method of claim 1, wherein pairing the access point with the new wireless device comprises exchanging security keys.

7. The method of claim 1, further comprising indicating, on the access point, a condition of successful pairing.

8. A method for pairing a wireless device with an access point in a wireless network using a personal computer in communications with the access point, the method comprising:
   receiving, by the access point, a selection of a service set identifier for the wireless device from the personal computer;
   inhibiting, by the access point, broadcast of all visible service set identifiers operating with pubic identification associated with the access point on the wireless network except the received service set identifier which is the only service set identifier visible to the wireless device after the inhibiting;
   receiving, at the access point, a logical push button configuration activation from the personal computer;
   pairing the access point with the wireless device over the wireless network, the wireless device paired with the visible received service set identifier;
   restoring broadcast of all service set identifiers associated with the access point on the wireless network, wherein the service set identifiers previously rendered hidden by inhibiting broadcast are made visible to the new wireless device; and
   exchanging information between the access point and the wireless device across the wireless network.

9. The method of claim 8, wherein inhibiting broadcast of all service set identifiers except the received service set identifier limits the wireless device to pair only with the selected service set identifier.

10. The method of claim 8, wherein inhibiting broadcast of all service set identifiers except the received service set identifier excludes pairing of the wireless device to a service set identifier that is not associated with the wireless device.

11. The method of claim 8, wherein receiving a logical push button configuration activation from the personal computer initiates pairing the access point with the wireless device.

12. The method of claim 8, wherein pairing the access point with the wireless device comprises exchanging security key information.

13. An access point that pairs with a wireless device using a personal computer in communications with the access point, the access point comprising:
   a wireless interface for communicating over a wireless network;
   an input and output interface that couples the personal computer to the access point, the input and output interface receiving a selection of a service set identifier for the wireless device from the personal computer to be used to pair the wireless device to the access point;

a processor, connected to memory, that functions to control the wireless interface for pairing with the wireless device via the wireless network, the processor controlling the wireless interface to inhibit broadcast of all service set identifiers operating with public identification associated with the access point on the wireless network except for the received service set identifier from the personal computer, the received service set identifier is the only service set identifier visible to the wireless device after the inhibiting;

wherein the access point receives from the personal computer a logical push button configuration activation, thereafter the processor acts to control the wireless interface to pair the access point with the wireless device using the visible service set identifier;

thereafter the processor causing the wireless interface to restore broadcasting of all of the service set identifiers associated with the access point on the wireless network, wherein the service set identifiers previously rendered hidden by inhibiting broadcast are made visible to the new wireless device.

14. The access point of claim 13, wherein the processor controlling the wireless interface to inhibit broadcast of all service set identifiers except for the received service set identifier from the personal computer limits the wireless device to pair with only a selected service set identifier.

15. The method of claim 13, wherein pairing the access point with the wireless device comprises exchanging security keys.

\* \* \* \* \*